June 28, 1927.

G. S. EVANS

PISTON

Filed Nov. 18, 1925

1,634,024

INVENTOR
G. S. EVANS
BY
ATTORNEY

Patented June 28, 1927.

1,634,024

UNITED STATES PATENT OFFICE.

GEORGE SEXTON EVANS, OF MIDDLE BRIGHTON, VICTORIA, AUSTRALIA.

PISTON.

Application filed November 18, 1925, Serial No. 69,883, and in Australia June 24, 1925.

This invention relates to pistons and plungers more particularly to pistons for engines such, for example, as internal combustion engines.

In instances where pistons are provided with circumferential grooves to accommodate spring or split rings there is always a possibility of the rings being fractured or damaged when sprung into or out of position. The assembly and dismounting of the split rings is also liable to prove a difficult and lengthy operation.

One of the objects of the present invention is to overcome the objections referred to by providing improvements in pistons which will enable the split rings to be readily assembled around the piston, and as readily removed, without need for initially expanding the rings or for springing them into and out of position.

A further object of the invention is to provide simple and effective means for steadying the piston during its reciprocation in the cylinder so that any side play or chattering is prevented. This advantage is obtained without materially increasing frictional losses whilst expansion of the piston is effectively provided for.

Referring to the drawings which form part of this specification :—

Figures 1, 2:
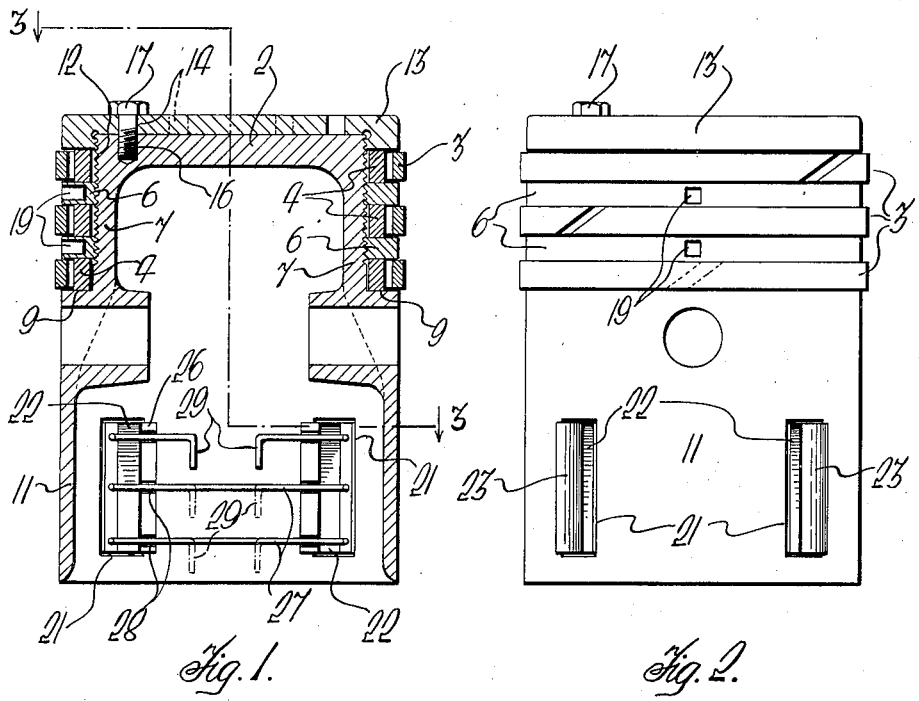
Figure 1 is a longitudinal section of a piston embodying the present improvements.
Figure 2 is an external view of a piston and associated parts as seen in Figure 1.

In accordance with this invention a piston or plunger, which may be of aluminum or aluminium alloy or any other metal, is reduced in diameter from its head 2 for a suitable distance longitudinally. The length of this reduced portion may vary according to the number and width of the split rings 3 intended to be employed, or to other circumstances.

A series of removable collars are spaced at longitudinal intervals around the exterior of the piston to form grooves for the reception of the piston rings. I employ preferably a series of minor and major collars 4 and 6 which are capable of being applied to and removed from the reduced portion 7 of the piston in a longitudinal direction and which, when in position, form circumferential grooves for freely accommodating the split rings 3.

The minor collars 4 are of relatively small outer diameter and may be of slightly greater longitudinal dimensions than the split rings, while the major collars 6 are of large outer diameter and are spaced apart by the minor collars.

One of the minor collars 4 may be placed around the reduced portion 7 of the piston so as to bear against the shoulder 9 formed at the junction of said reduced portion and the major portion or skirt 11 of the piston. A split ring 3 may then be passed axially along the reduced portion 7 so that it is disposed freely around the said minor collar. One of the major collars 6 is then positioned around the piston so that it bears against the adjacent face of the first assembled minor collar, thereby forming a circumferential groove in which the said split ring is retained whilst being free to expand and contract. A second minor collar 4 may then be placed around the reduced portion of the piston so as to bear against the first major collar whereupon a second split ring and a second major collar may be applied, minor and major collars and split rings being, if desired, subsequently assembled around the reduced portion of the piston in the manner indicated.

Figures 3, 4:
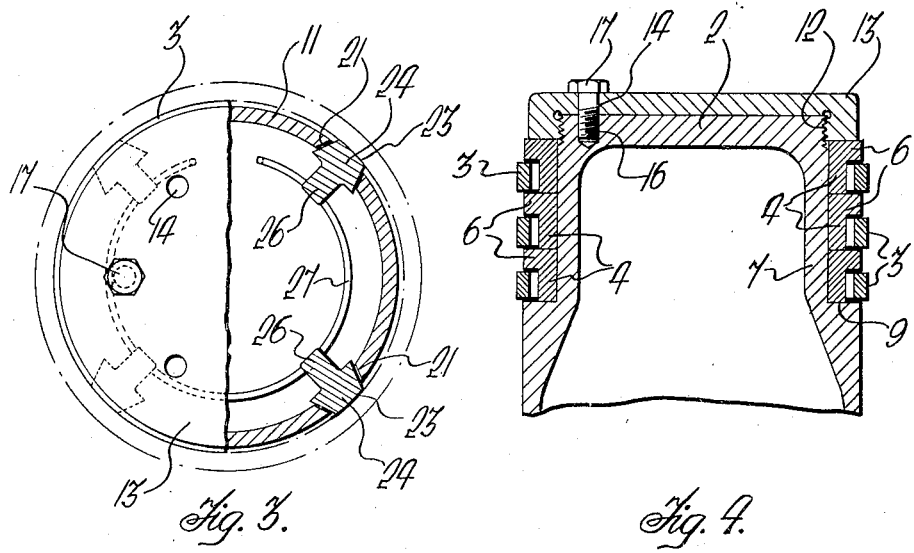
Figure 3 is a part section taken on the line 3.3 Figure 1.
Figure 4 is a fragmentary longitudinal section of a piston according to a modification.

The minor and major collars may be separate from each other, as shown in Figure 1, or I may employ composite collars, as seen in Figure 4, each having two integral portions 4 and 6 of minor and major external diameters.

In order to detachably retain the assembly of collars 4 and 6 and split rings 3 on the piston, the said reduced portion 7 may be externally screw threaded as at 12 to receive a screw cap 13 which may be screwed tightly against the collar last applied, thus holding the assembly of collars rigidly in position.

Apertures 14 may be formed through the screw cap 13 and a screw threaded aperture 16 formed in the piston head to receive a set screw 17 whereby the cap may be effectively secured in position. The apertures in the screw cap are circumferentially spaced so that they will coincide with the aperture in the piston head at various circumferential positions of the cap.

If desired the reduced portion of the piston may be screw threaded for the whole, or the greater part, of its length and the minor or the major collars similarly screw threaded to provide for greater security of the assembled collars. In such instances the collars may have apertures 19, Figures 1 and 2, for the insertion of a tool whereby they may be readily screwed on to and off the piston.

It will be evident that the split rings may be readily applied without being initially expanded and as easily removed when so desired.

Where aluminium or alloy pistons are employed it is desirable to provide relatively large clearance between the piston and cylinder walls in order to allow for expansion of the piston. Such relatively large clearance is liable to give rise to side play or chattering of the piston and to obviate this the portion of major diameter or the skirt 11 of the piston is provided with a number of slots 21 to accommodate spring influenced distance pieces 22 which yieldingly bridge the space between the piston and the cylinder wall which latter is indicated by broken lines in Figure 3. These slots are circumferentially spaced, preferably at equidistant intervals, and may be elongated in a longitudinal direction. For each said slot there is provided a spring influenced distance piece 22 which is resiliently projected through said slot so that the outer face 23 of the distance piece yieldingly contacts with the interior face of the cylinder and thus exerts a steadying influence on the piston. The heads 24 of the distance pieces may increase in cross section from their outer or contact faces 23 so that the distance pieces are prevented from being completely projected through the slots 21 on the piston.

Each distance piece may have a stem 26 which extends a short distance radially into the interior of the piston, and a spring or springs 27 are associated with these stems to thereby force the distance pieces radially outwards, at the required pressure. These springs 27 may consist of metal divided rings or hoops which may be entered through the open end of the piston and then contracted and placed in circumferentially aligned notches or recesses 28 which are formed in the inner end faces of the stems 26 of the respective distance pieces.

The end portions of the springs 27 may be turned sidewardly to form finger grips 29 whereby the springs may be more readily contracted preparatory to insertion and withdrawal.

It will be evident that the distance pieces are effectively pressed against the wall of the cylinder irrespective of expansion and contraction of the piston.

Having now described my invention what I claim as new and desire to secure by Letters Patent is:—

A piston having a body portion of relatively reduced diameter, a series of minor collars adapted to be arranged about said body portion of relatively reduced diameter and to be wholly free of any connection with such body portion, the vertical dimension of said collars corresponding approximately to the similar dimension of the piston rings to be used, and a series of major collars arranged alternately with respect to the minor collars, said major collars having a diameter slightly less than the combined diameters of the minor collars and piston rings and having a vertical dimension less than the similar dimension of the minor collars, the major collars being arranged for threaded connection with the reduced diameter body portion of the piston.

In testimony whereof I affix my signature.

GEORGE SEXTON EVANS.